US012052535B2

(12) United States Patent
Chou et al.

(10) Patent No.: US 12,052,535 B2
(45) Date of Patent: Jul. 30, 2024

(54) PASSIVE SOUNDING DEVICE INTEGRATED INTO FLAT PANEL DISPLAY

(71) Applicant: Glass Acoustic Innovations Co., Ltd., New Taipei (TW)

(72) Inventors: Yao-Sheng Chou, New Taipei (TW); Hsiao-Yi Lin, New Taipei (TW); Yi-Feng Wei, New Taipei (TW)

(73) Assignee: Glass Acoustic Innovations Co., Ltd., New Taipei (TW)

( * ) Notice: Subject to any disclaimer, the term of this patent is extended or adjusted under 35 U.S.C. 154(b) by 177 days.

(21) Appl. No.: 17/888,488

(22) Filed: Aug. 16, 2022

(65) Prior Publication Data

US 2023/0054536 A1 Feb. 23, 2023

(30) Foreign Application Priority Data

Aug. 20, 2021 (TW) ................................ 110130882

(51) Int. Cl.

| | |
|---|---|
| ***H04R 25/00*** | (2006.01) |
| ***H04R 1/02*** | (2006.01) |
| ***H04R 7/02*** | (2006.01) |

(52) U.S. Cl.

CPC ............... *H04R 1/028* (2013.01); *H04R 7/02* (2013.01); *H04R 2499/15* (2013.01)

(58) Field of Classification Search

CPC ...... H04R 1/028; H04R 2499/15; H04R 7/02; H04R 1/2834; H04R 2307/201; H04R 2307/204; H04R 7/04; H04R 7/20

See application file for complete search history.

(56) References Cited

U.S. PATENT DOCUMENTS

2023/0053470 A1* 2/2023 Chou ....................... H04R 1/02

* cited by examiner

*Primary Examiner* — Phylesha Dabney

(74) *Attorney, Agent, or Firm* — Chih Feng Yeh; Yongjean Consulting Inc.

(57) ABSTRACT

A passive sounding device integrated into a flat panel display includes a glass diaphragm having a first surface for forming a light-emitting array of the flat-panel display thereon, a suspension edge, and a frame, wherein the glass diaphragm is tightly sealed with the frame through the suspension edge to form an airtight space in the frame, and the glass diaphragm vibrates and emits sound in response to the pressure of the sound waves generated by an active sounding device.

13 Claims, 3 Drawing Sheets

PASSIVE SOUNDING DEVICE INTEGRATED INTO FLAT PANEL DISPLAY

CROSS-REFERENCE STATEMENT

The present application is based on, and claims priority from, Taiwan Patent Application Serial Number 110130882, filed Aug. 20, 2021, the disclosure of which is hereby incorporated by reference herein in its entirety.

BACKGROUND

1. Technical Field

The present invention relates to a sounding device, and more particularly, a passive sounding device integrated into flat panel display.

2. Related Art

Generally speaking, a traditional acoustic system includes a closed case-body and a sound generating unit disposed on the closed case-body. A cavity is formed between the closed case-body and the sound generating unit. Due to the volume limitation of the cavity in the acoustic system, the acoustic system, especially for small acoustic systems, is difficult to achieve satisfactory bass reproduction.

With the development of science and technology, sound generating units need to be provided for sounding purpose in various electronic devices. Due to the trend of gradual flattening and thinning of electronic products such as monitors, TVs, and notebook computers, many sounding devices (speakers) have been developed to be individually equipped with vibration plate (diaphragm) to form flat sounding devices, which are different from the traditional cone-shaped vibration plates due to present-day demand.

A passive radiator, which itself does not contain a drive system. When it relies on the active speaker to work, it compresses the air in the acoustic cavity and is driven to convert the heat and kinetic energy into sound signals, where the heat and kinetic energy are generated by the compressed air of the active speaker due to vibration during the electro-acoustic conversion process.

Conventionally, the sound generating unit is usually arranged under the display panel, the volume of the sound generating unit will take up a larger space for better sounding effect. Good sounding effect cannot be achieved if the volume of the sound generating unit is too small, especially resulting deterioration of the low frequency characteristics. Therefore, users cannot get a good listening experience.

In the case of limited space, how to design a more efficient sounding device and improve its frequency response in low-frequency regime is a major challenge.

SUMMARY

Based on the above descriptions, the present invention proposes a passive sounding device to solve the deficiencies of the prior art, which can be integrated into a flat panel display. The passive sounding device includes a glass diaphragm having a first surface for forming a light-emitting array of the flat-panel display thereon, a suspension device, and a frame body, wherein the glass diaphragm is tightly sealed with the frame body through the suspension device to form an airtight space in the frame body, and the glass diaphragm vibrates and emits sound in response to the pressure of the sound waves generated by an active sounding device.

In one preferred embodiment, the passive sounding device integrated into a flat panel display further includes a metal frame been integrated with the suspension device for adjusting the counterweight responded to the pressure of the sound waves to extend the bass of the passive sounding device.

In one preferred embodiment, the suspension device is made of rubber.

In one preferred embodiment, the first surface faces outward of opening of said frame body.

In one preferred embodiment, the flat panel display is TFT-LCD, OLED, LED, mini-LED or micro-LED display panel.

In one preferred embodiment, the active sounding device is a speaker.

In one preferred embodiment, the display panel is used as a passive radiator to adjust counterweight responded to the pressure of said sound waves to extend bass of the passive sounding device.

In one preferred embodiment, speaker is disposed inside the frame body or coupled to the frame body.

In one preferred embodiment, the speaker coupled to the frame body is disposed inside a cavity interconnected with the frame body.

In one preferred embodiment, the cavity interconnected with an accommodation space of the frame body to form a composite sealed space.

In one preferred embodiment, the glass diaphragm further including an adhesive film attached thereon.

In one preferred embodiment, the adhesive film is selected from polyethylene terephthalate (PET), polyimide (PI) or the likes.

In one preferred embodiment, the metal frame is made of aluminum or aluminum alloy.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As previously described in the background section, the planar sounding device is similar to a size-reduced planar speaker. For example, U.S. Pat. No. 8,447,063 B2 disclosed a flat thin dynamic speaker comprising a motor unit, a suspension unit, a radiating unit and a frame arranged in such a manner that the motor unit and the suspension unit are on the same plane while the radiation unit is located on top of the motor unit so that the thickness of the speaker assembly is reduced while the performance of the speaker assembly is maintained or even improved. Since glass has the light weight and high strength diaphragm characteristics, it has the potential to develop a wider range of sound spectrum.

The glass diaphragm made of reinforced glass has high electro-acoustic conversion efficiency (because of its high mechanical strength, low density, and fast sound traveling speed characteristics), and a wider operating frequency range (because of its strong rigidity, it can reduce split vibration and small deformation at low frequencies), good sound quality/timbre, and better processing properties. The main portion of display of the electronic device is made of glass. Therefore, the present invention proposes a passive sounding device that integrates a sound generating unit into a flat panel display, and utilizes the glass of the flat panel display as a diaphragm.

Figure 1:
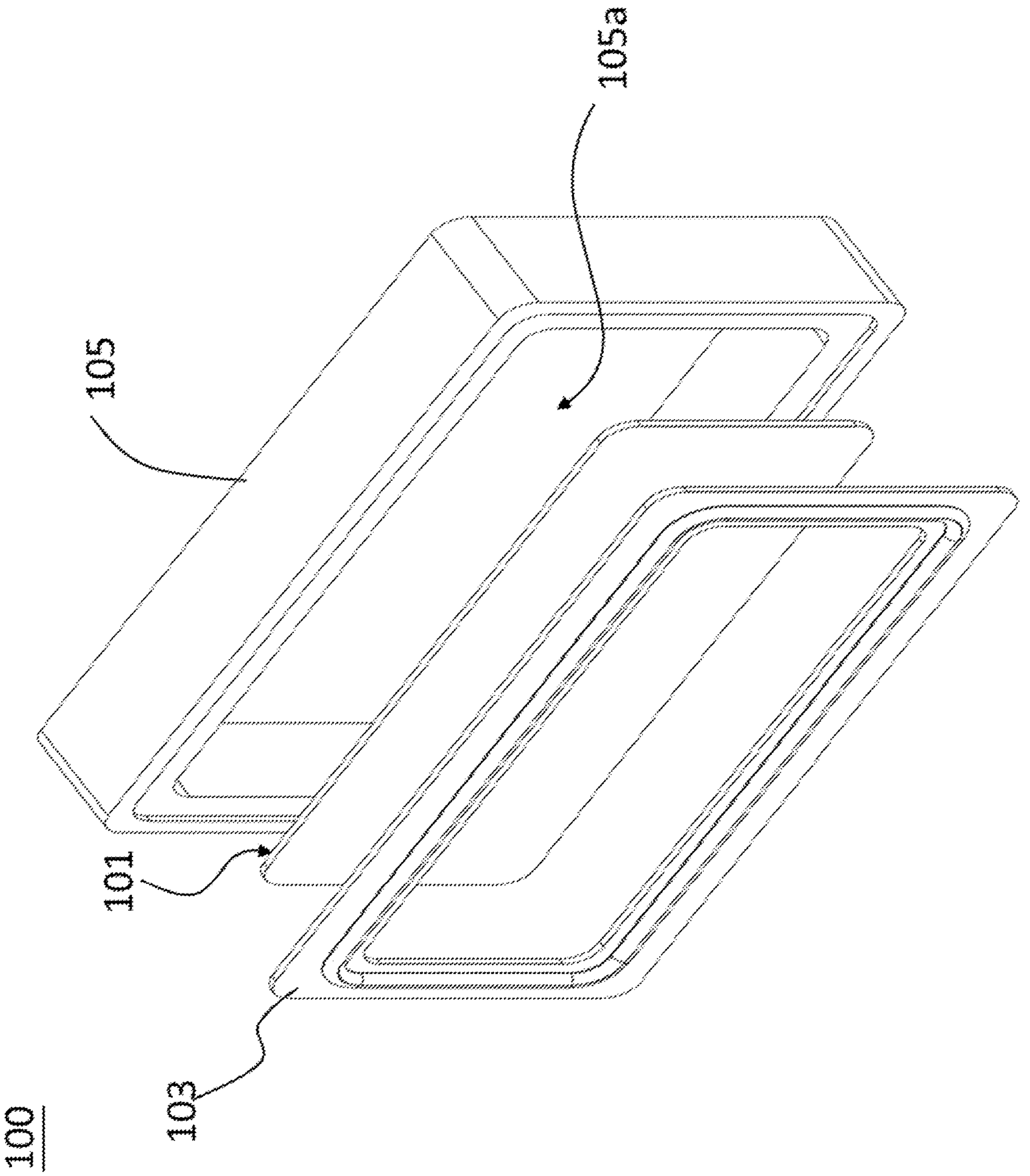
FIG. 1 illustrates an exploded schematic diagram of a passive sounding device integrated into a flat panel display according to one embodiment of the present invention.

FIG. 1 illustrates an exploded view of a passive sounding device 100 integrated into a flat panel display, which includes a glass diaphragm 101, a suspension device 103 and a frame body 105 having an accommodation space **105*a*** within it.

Figure 2:
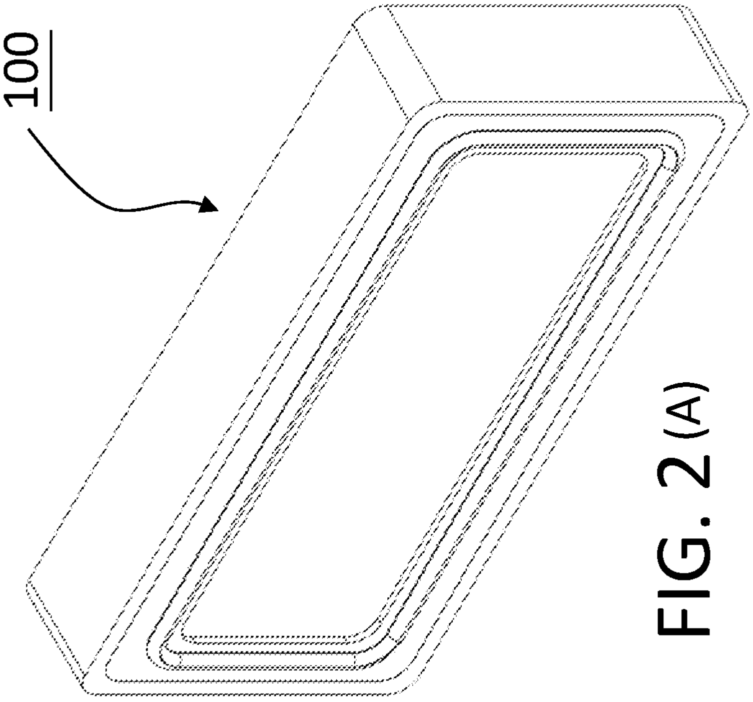
FIG. 2(A) illustrates a combination diagram of a passive sounding device integrated into a flat panel display according to one embodiment of the present invention.
FIG. 2(B) illustrates a cross-sectional view of a passive sounding device integrated into a flat panel display according to one embodiment of the present invention.
FIG. 2(C) illustrates a top view of a glass diaphragm (display panel) of a passive sounding device integrated into a flat panel display according to one embodiment of the present invention.
Figure 2:
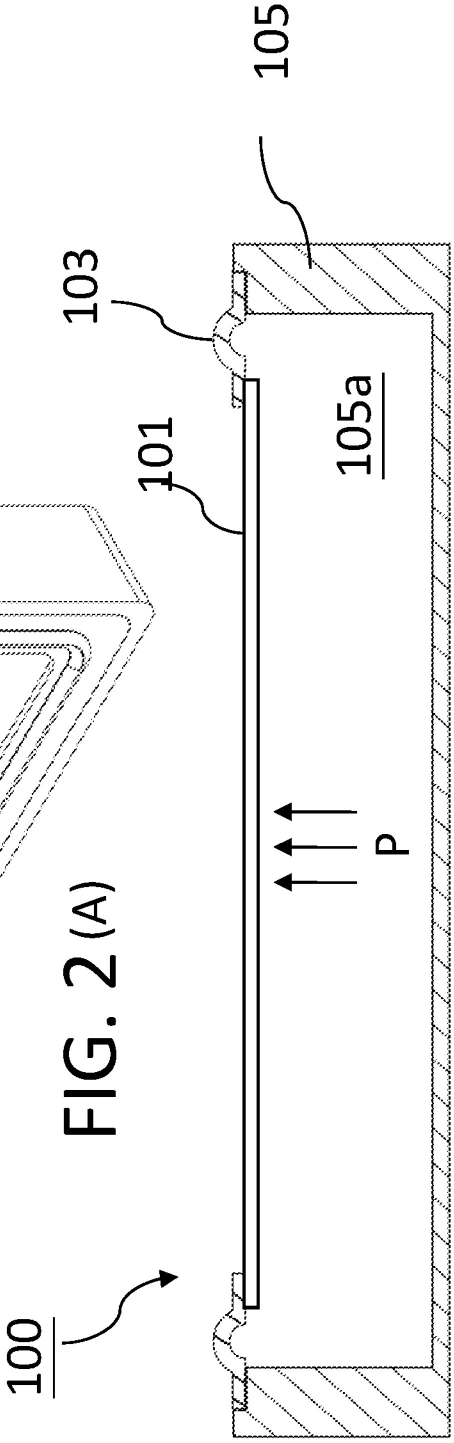

FIG. 2(A) illustrates a combination diagram of a passive sounding device integrated into a flat panel display 100.

FIG. 2(B) illustrates a cross-sectional view of a passive sounding device 100 integrated into a flat panel display, where the glass diaphragm 101 is acted as a passive diaphragm tightly sealed to the frame body 105 through the suspension device 103 to form an airtight space **105*a* inside the frame body 105. The glass diaphragm 101** vibrates and emits sound in response to the pressure of the sound waves generated by an active sounding device.

In one embodiment, the active sound generating device (speaker) may be a speaker disposed inside the frame body 105 or coupled to the frame body 105. The speaker may be arranged inside the frame body 105 sharing the same sealed cavity with the passive sounding device, or may be arranged in a cavity interconnected with the accommodation space **105*a* of the frame body 105 to constitute a composite sealed cavity together with the accommodation space 105*a* of the frame body 105**.

In one embodiment, the suspension device 103 is a rubber suspension device.

In one embodiment, the display panel of the glass diaphragm 101 can be integrated with a rubber suspension device and a metal frame to adjust the counterweight of diaphragm to responded to the pressure of sound waves produced by the speaker to extend the bass of the passive sounding device 100.

In one embodiment, the glass diaphragm 101 further includes an adhesive film attached onto it.

In one embodiment, the material of the adhesive film is selected from polyethylene terephthalate (PET), polyimide (PI) or similar materials.

In one embodiment, the metal frame can be integrated with the rubber suspension device, and therefore the counterweight to response to the pressure of the sound waves produced by the active sounding device can be adjusted according to the size of the display panel and the size of the sealed cavity to extend the bass of the passive sounding device. The metal frame is made of aluminum or aluminum alloy.

In one embodiment, the glass diaphragm is a display panel, which can be selected from LED mini-LED, or OLED display panel.

Figure 2C:
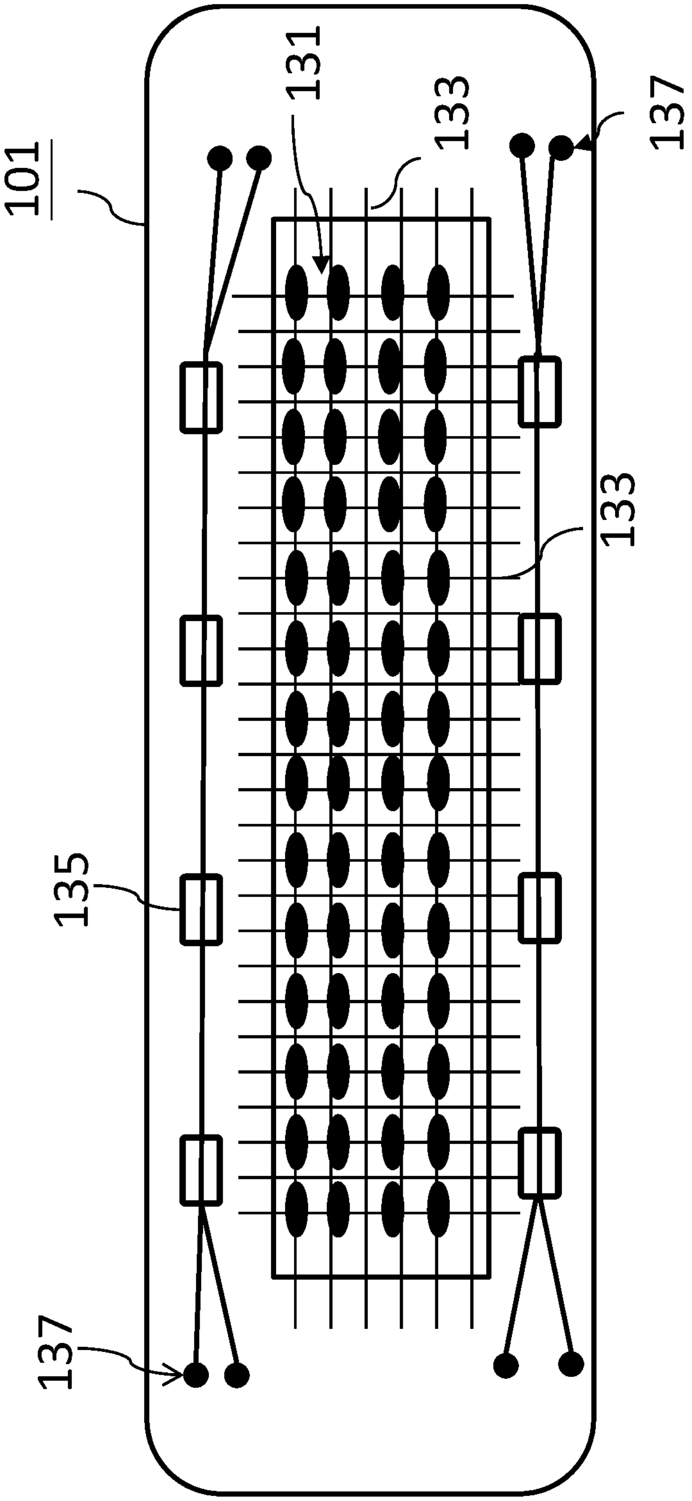

FIG. 2(C) illustrates a top view of a glass diaphragm (display panel) 101 of a passive sounding device 100 integrated into a flat panel display, which includes a light-emitting array 131 and corresponding wirings 133. The image display of the light-emitting array 131 is driven and controlled by an image driver IC 135, and the image driver IC 135 electrically connected to a control circuit board (not shown) via a plurality of through holes 137 formed on the glass diaphragm (display panel) 101. In one embodiment, light-emitting array 131 is disposed on a first surface of the glass diaphragm 101, the first surface faces outward to the opening of the frame body 105.

The display panel can be used as a passive radiator (passive radiator) for adjusting the counterweight to extend the bass of the sounding device. The advantage of this application is that there is no need to make different speakers according to the size of the panel, which can reduce the cost and have extended bass of the passive sounding device. In one embodiment, the display panel, which is a glass diaphragm, can be used to adjust the counterweight responding to the pressure of the sound waves produced by the active sounding device (speaker) to extend the bass together with the use of rubber suspension device and the metal frame.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A passive sounding device integrated into a flat panel display, said device comprising:

a glass diaphragm having a first surface, wherein a light emitting array is formed on said first surface; and a suspension device; and a frame body, wherein said glass diaphragm is tightly sealed with said frame body through said suspension device to form an airtight space in said frame body, and said glass diaphragm vibrates and emits sound in response to the pressure of the sound waves generated by an active sounding device.

2. The passive sounding device integrated into a flat panel display of claim 1, further including a metal frame been integrated with said suspension device for adjusting counterweight responded to said pressure of said sound waves to extend bass of said passive sounding device.

3. The passive sounding device integrated into a flat panel display of claim 2, wherein said suspension device is made of rubber.

4. The passive sounding device integrated into a flat panel display of claim 2, wherein said metal frame is made of aluminum or aluminum alloy.

5. The passive sounding device integrated into a flat panel display of claim 1, wherein said first surface faces outward of opening of said frame body.

6. The passive sounding device integrated into a flat panel display of claim 1, wherein said flat panel display is TFT-LCD, OLED, LED, mini-LED or micro-LED display panel.

7. The passive sounding device integrated into a flat panel display of claim 6, wherein said display panel is used as a passive radiator to adjust counterweight responded to said pressure of said sound waves to extend bass of said passive sounding device.

8. The passive sounding device integrated into a flat panel display of claim 1, wherein said active sounding device is a speaker.

9. The passive sounding device integrated into a flat panel display of claim 8, wherein said speaker is disposed inside said frame body or coupled to said frame body.

10. The passive sounding device integrated into a flat panel display of claim 9, wherein said speaker coupled to said frame body is disposed inside a cavity interconnected with said frame body.

11. The passive sounding device integrated into a flat panel display of claim 10, wherein said cavity interconnected with an accommodation space of said frame body to form a composite sealed space.

12. The passive sounding device integrated into a flat panel display of claim 1, wherein said glass diaphragm further including an adhesive film attached thereon.

13. The passive sounding device integrated into a flat panel display of claim 12, wherein said adhesive film is selected from polyethylene terephthalate (PET), polyimide (PI) or the likes.

* * * * *